(12) United States Patent
Egan, Jr. et al.

(10) Patent No.: US 8,166,699 B1
(45) Date of Patent: May 1, 2012

(54) SWIVELING TIP FOR A FISHING ROD

(76) Inventors: Raymond W. Egan, Jr., West Chesterfield, NH (US); Todd E. Bottomley, Chesterfield, NH (US)

( * ) Notice: Subject to any disclaimer, the term of this patent is extended or adjusted under 35 U.S.C. 154(b) by 0 days.

(21) Appl. No.: 12/958,382

(22) Filed: Dec. 1, 2010

(51) Int. Cl.
 *A01K 87/04* (2006.01)
(52) U.S. Cl. ............................................. 43/24
(58) Field of Classification Search ................ 43/24
 See application file for complete search history.

(56) References Cited

U.S. PATENT DOCUMENTS

| | | | |
|---|---|---|---|
| 1,116,721 A * | 11/1914 | Meder | 43/24 |
| 1,142,796 A * | 6/1915 | Brugman | 43/24 |
| 2,324,353 A | 2/1942 | Berry | |
| 2,525,948 A * | 10/1950 | Ruiz | 43/24 |
| 2,559,933 A | 10/1951 | Briney | |
| 2,652,654 A | 9/1953 | Bahn | |
| 2,878,608 A * | 3/1959 | O'Brien, Jr. | 43/24 |
| 3,006,099 A | 10/1961 | Gourley | |
| 3,303,595 A | 2/1967 | Wells et al. | |
| 4,807,385 A * | 2/1989 | Morishita | 43/24 |
| 5,276,991 A | 1/1994 | Stotesbury et al. | |
| 5,383,300 A * | 1/1995 | Stotesbury et al. | 43/24 |
| 5,417,007 A | 5/1995 | Stotesbury et al. | |
| 5,531,041 A * | 7/1996 | Betto | 43/24 |
| 5,560,139 A | 10/1996 | Lembree | |
| 6,263,609 B1 * | 7/2001 | Kollodge et al. | 43/25 |
| 6,612,065 B1 | 9/2003 | Blanchette et al. | |
| 6,802,151 B1 * | 10/2004 | Jochum | 43/24 |
| 7,513,075 B2 | 4/2009 | Gerber | |
| 2005/0034353 A1 * | 2/2005 | Gustlin | 43/24 |

* cited by examiner

*Primary Examiner* — Christopher P Ellis
(74) *Attorney, Agent, or Firm* — The Bilicki Law Firm, PC; Carl A. Hjort, III

(57) ABSTRACT

A swiveling tip for a fishing rod includes a housing with a barrel positioned therein and a roller. The housing includes a first bore for receiving the barrel and a second bore for receiving a fishing rod. The barrel is capable of rotating 360° around a longitudinal axis of the second bore. The barrel has an axle mounting member at a distal end thereof and a through hole that is parallel to and offset from the second longitudinal axis for receiving a fishing line. The roller is configured to rotate about the axle and is adapted to redirect the fishing line from a first direction to a second direction.

19 Claims, 4 Drawing Sheets

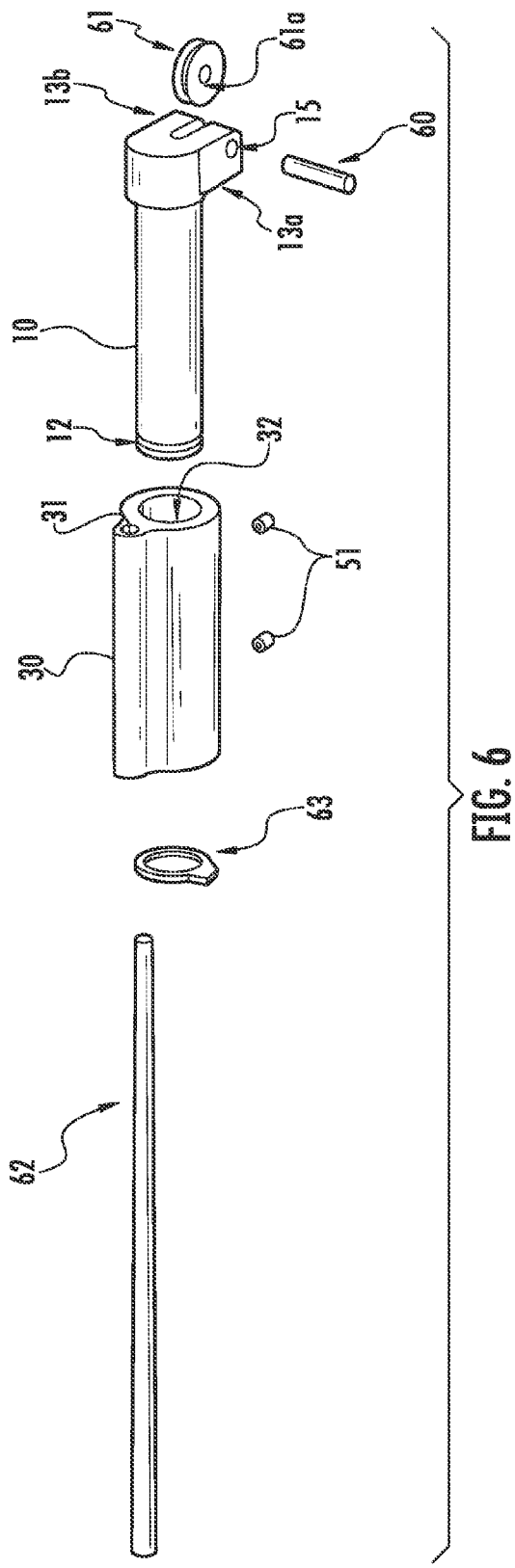
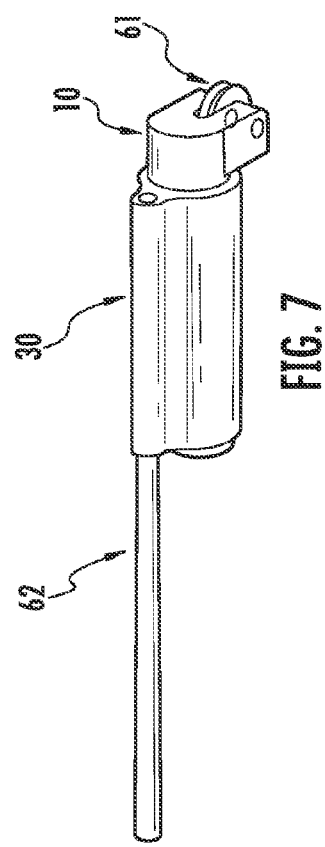
FIG. 6
FIG. 7

SWIVELING TIP FOR A FISHING ROD

BRIEF DESCRIPTION OF DRAWINGS

FIG. 6 illustrates an exploded view of an embodiment of a swiveling tip for a fishing rod.

FIG. 7 illustrates an assembled view of an embodiment of a swiveling tip for a fishing rod.

DETAILED DESCRIPTION

Figure 1:
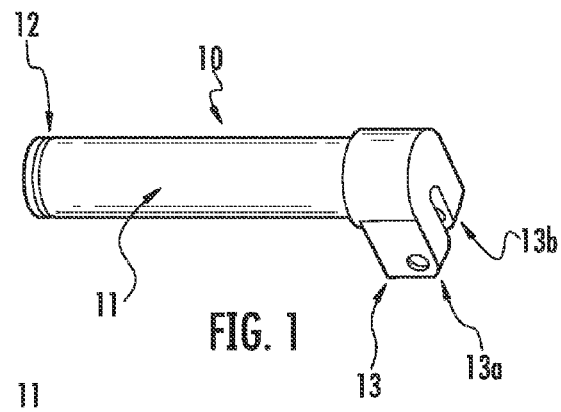
FIG. 1 illustrates a top perspective view of an embodiment of a barrel for a swiveling tip for a fishing rod.

An embodiment of a swiveling tip for use with a fishing rod is shown and described. In the embodiment, there is a housing which is adapted for connection to a fishing rod. The housing has a bore therethrough for receiving a barrel. The barrel further comprises a roller on an axle over which fishing line passes, and is redirected. The barrel is capable of 360° rotation within the bore of the housing. Reference will now be made in detail to the components of an embodiment of the swiveling tip, examples of which are illustrated in the drawings.

Figure 2:
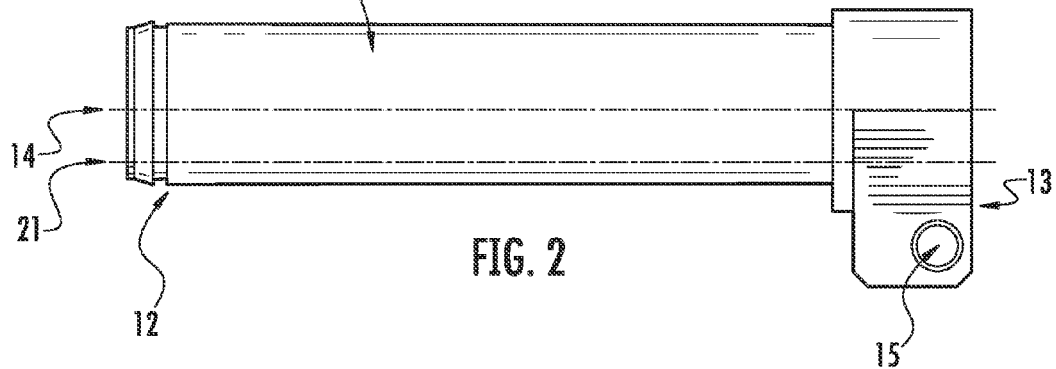
FIG. 2 illustrates a side view of an embodiment of a barrel for a swiveling tip for a fishing rod.
Figure 3:
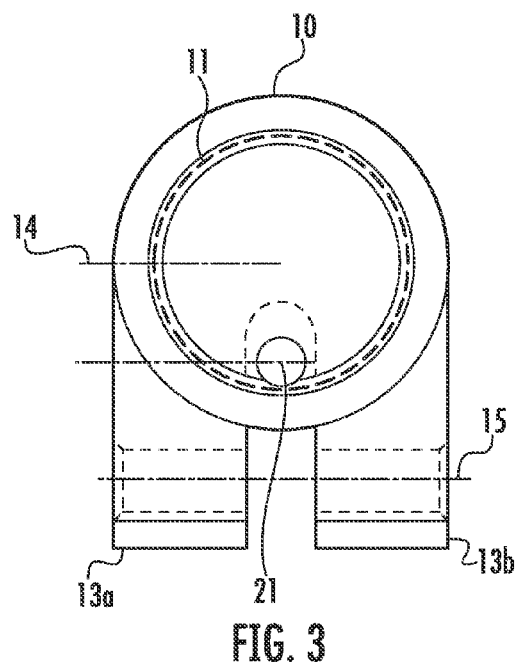
FIG. 3 illustrates a cross-sectional view of a barrel for a swiveling tip for a fishing rod.

FIGS. 1-3 illustrate one embodiment of a barrel for a swiveling tip for a fishing rod. The barrel 10 has a generally cylindrical portion 11 for mating with the housing of the swiveling tip. At the proximal end of barrel 10, there is a groove 12, into which a retaining member can be inserted to retain barrel 10 in the housing of the swiveling tip. At the distal end of barrel 10, there is an axle mounting member 13. Axel mounting member may take the form of two ears 13a and 13b extending perpendicular to the axis 14 of barrel 10. A hole 15 is provided in both of ears 13a and 13b for receiving an axle therethrough.

As is shown in FIGS. 6 and 7, axle 60 is disposed in hole 15 and roller 61 is disposed on axel 60 and is thereby held in place between ears 13a and 13b. Through hole 21 is shown in FIGS. 2-3. Through hole 21 is parallel to and offset from axis 14. Fishing line (not shown) passes through hole 21 and then over roller 61, thereby being redirected from a first direction to a second direction.

Figure 4:
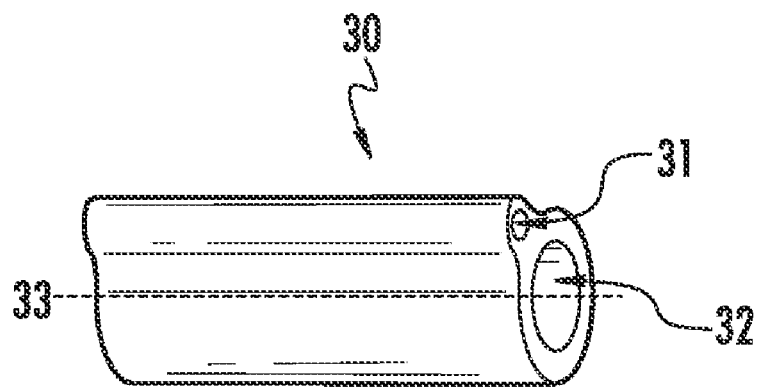
FIG. 4 illustrates a top perspective view of an embodiment of a housing for a swiveling tip for a fishing rod.
Figure 5:
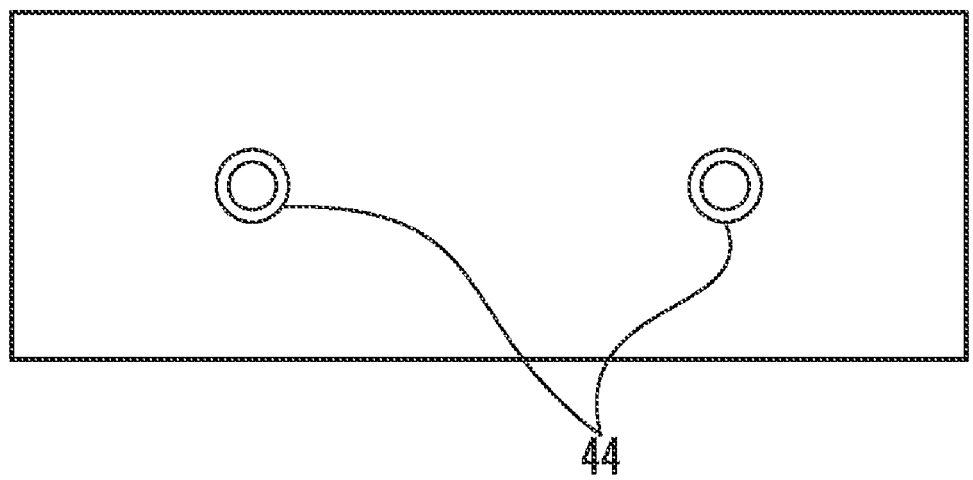
FIG. 5 illustrates a bottom view of an embodiment of a housing for a swiveling tip for a fishing rod.

FIGS. 4 and 5 also illustrate an embodiment of a housing for a swiveling tip for a fishing rod. Housing 30 has two parallel bores therethrough 31 and 32. Bore 31 is adapted for connecting the housing to a fishing rod. It can be appreciated that bore 31 need not extend all the way from the proximal end of housing 30 to the distal end of housing 30, as long as bore 31 is long enough to accommodate a section of the fishing rod sufficient for attachment of the housing to the rod. Alternatively, bore 31 may extend the entire length of housing 30. Bore 32 extends the entire length of housing 30 and is of a diameter slightly larger than barrel 10. When assembled, barrel 10 is disposed within bore 32 and is able to rotate 360° about the axis 33 of bore 32. It should be appreciated that barrel 10 and bore 32 act as bearing surfaces and may be configured to house rotary bearings. Barrel 10 is formed of a solid material in order to allow for rotational movement of barrel within bore 32.

As shown in FIG. 5, set screw holes 44 are provided in housing 30. Set screw holes 44 are generally perpendicular to axis 33. Set screw holes 44 allow set screws 51 penetrate into bore 31, thereby securing housing 30 to the fishing rod. It will be appreciated that housing 30 can be secured to the fishing rod by a suitable means such as adhesives or a friction fit, thereby obviating the need for set screw holes 44 and set screws 51. Set screw holes 44 in bore 32 serve to allow access to set screws 51 and provide lubrication points.

FIGS. 6 and 7 show exploded and assembled views of the swiveling tip for a fishing rod 1. As shown in these views, fishing rod 62 is inserted into bore 31 of housing 30, and may be retained in bore 31 by set screws 51. As noted above, any suitable means for securing fishing rod 62 in bore 31 may be used, such as adhesives or a friction fit in addition to or in lieu of using set screws 51. Barrel 10 is inserted into bore 32 of housing 30. Barrel 10 may be retained in bore 32 by retaining member 63. Retaining member 63 may take any suitable form, including but not limited to a retention clip. Retaining member 63 may engage groove 12 on barrel 10. Roller 61 is disposed between ears 13a and 13b of barrel 10, and mounted on axle 60 which passes through hole 15 in ears 13a and 13b. Hole 61a is provided in roller 61 to accommodate axle 60.

It will be appreciated that barrel 10, roller 61 and housing 30 may be constructed of any suitable material, including but not limited to stainless steel, stamped steel, other metals or plastic. Generally cylindrical portion 11 of barrel 10 is slightly longer than housing 30. To maximize the bearing characteristics of housing 30 and barrel 10, the length of generally cylindrical portion 11 (and therefore also the length of housing 30) should be approximately four times the diameter of generally cylindrical portion 11. However, one of ordinary skill in the art would appreciate that ratios of the length of cylindrical portion 11 to the diameter of cylindrical portion 11 of greater than or less than 4 to 1 could be used. It should also be appreciated that through hole 21 is parallel to and offset from axis 14 of barrel 10. Because through hole 21 is offset from axis 14, a moment arm is created, such that fishing line disposed in through hole 21 may act to rotate barrel 10 in housing 30, thereby allowing the swiveling tip 1 to swivel in the direction of line pull. One of ordinary skill in the art would readily appreciate that any one of a variety of distances between through hole 21 and axis 14 could be used to create the necessary moment arm.

Figure 8:
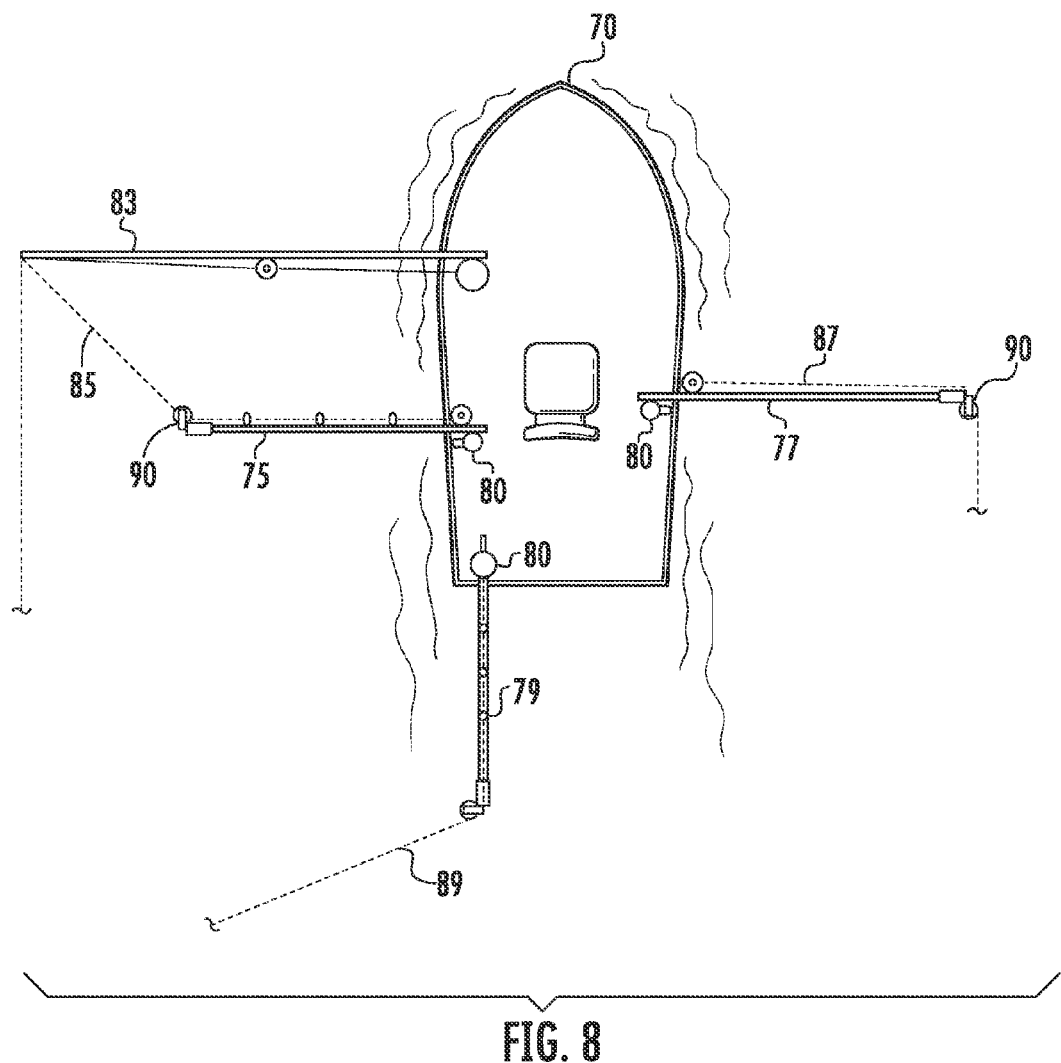
FIG. 8 is a top view of a swiveling tip for a fishing rod in use on a fishing boat.

As shown in FIG. 8, the swiveling tip for a fishing rod may be used in connection with outriggers on a fishing boat. Boat 70 is equipped with fishing rods 75, 77 and 79 using fishing lines 85, 87 and 89 respectively. One or more outriggers, such as outrigger 83 may be used. Each of fishing rods 75, 77 and 79 includes a reel 80 and a swiveling tip 90. The free motion of the swiveling tips allows the tips to be used with fishing rods alone or with outriggers without becoming disengaged with the tip.

While specific embodiments of the swiveling tip for a fishing rod have been described in detail, those with ordinary skill in the art will appreciate that various modifications and alternatives to those details could be developed in the light of the overall teachings of the disclosure. For example, various shapes of housings could be used, various means for attaching the roller tip to the fishing rod (e.g. glue), and varying geometries of the barrel could be used to achieve the results described herein. The examples used to illustrate the embodiments of the present invention in no way limit the applicability of the present invention to them.

We claim:

1. A swiveling tip for a fishing rod comprising:
a housing, having a first bore and a second bore therethrough, the first bore and the second bore having first and second longitudinal axes respectively, wherein the first and second longitudinal axes are generally parallel, and wherein the first bore is adapted for receiving the tip of a fishing rod;
a barrel, disposed in the second bore of the housing, wherein the barrel has a diameter that is smaller than the diameter of the second bore, and the barrel is able to rotate 360° around the second longitudinal axis of the second bore, wherein the barrel has an axle mounting member at a distal end thereof, and wherein the barrel has a through hole that is parallel to and offset from the second longitudinal axis, and wherein the through hole is adapted for receiving a fishing line therethrough;
a roller mounted on an axle, said axle connected to the axle mounting member of the barrel, and said roller being configured to rotate about the axle, and wherein the roller is adapted to redirect the fishing line from a first direction to a second direction.

2. The swiveling tip for a fishing rod of claim 1, wherein the length of the barrel is four times the diameter of the second bore through the housing.

3. The swiveling tip for a fishing rod of claim 1, wherein the barrel is retained within the second bore of the housing by a retaining clip.

4. The swiveling tip for a fishing rod of claim 1, wherein the housing further comprises a plurality of set screw holes in communication with the first bore, and wherein said set screw holes are adapted to receive set screws for attaching the housing to a fishing rod.

5. The swiveling tip for a fishing rod of claim 1, wherein the housing is attached to the fishing rod by an adhesive.

6. The swiveling tip for a fishing rod of claim 1, wherein the housing is attached to the fishing rod by a friction fit.

7. The swiveling tip for a fishing rod of claim 1, wherein the housing, the barrel, the axle and the roller are made of a material selected from the group comprising stainless steel, stamped steel, and plastic.

8. A swiveling tip for a fishing rod comprising:
a housing, having a first bore and a second bore therethrough, the first bore and the second bore having first and second longitudinal axes respectively;
a barrel, disposed in the second bore of the housing, wherein the barrel is able to rotate 360° around the second longitudinal axis of the second bore, wherein the barrel has an axle mounting member, and wherein the barrel has a through hole that is parallel to and offset from the second longitudinal axis, and wherein the through hole is adapted for receiving a fishing line therethrough;
a roller mounted on an axle, said axle connected to the axle mounting member of the barrel, and said roller being configured to rotate about the axle.

9. The swiveling tip for a fishing rod of claim 8, wherein the length of the barrel is four times the diameter of the second bore through the housing.

10. The swiveling tip for a fishing rod of claim 8, wherein the barrel is retained within the second bore of the housing by a retaining clip.

11. The swiveling tip for a fishing rod of claim 8, wherein the housing further comprises a plurality of set screw holes in communication with the first bore, and wherein said set screw holes are adapted to receive set screws for attaching the housing to the fishing rod.

12. The swiveling tip for a fishing rod of claim 8, wherein the housing, the barrel, the axle and the roller are made of a material selected from the group comprising stainless steel, stamped steel, and plastic.

13. A swiveling tip for a fishing rod comprising:
a housing, having a first bore and a second bore therethrough, the first bore and the second bore having first and second longitudinal axes respectively;
a barrel, disposed in the second bore of the housing, wherein the barrel has an axle mounting member, and wherein the barrel has a through hole, and wherein the through hole is adapted for receiving a fishing line therethrough;
a roller mounted on an axle, said axle connected to the axle mounting member of the barrel, and said roller being configured to rotate about the axle.

14. The swiveling tip for a fishing rod of claim 13, wherein the length of the barrel is four times the diameter of the second bore through the housing.

15. The swiveling tip for a fishing rod of claim 13, wherein the barrel is retained within the second bore of the housing by a retaining clip.

16. The swiveling tip for a fishing rod of claim 13, wherein the housing further comprises a plurality of set screw holes in communication with the first bore, and wherein said set screw holes are adapted to receive set screws for attaching the housing to a fishing rod.

17. The swiveling tip for a fishing rod of claim 13, wherein the housing is attached to the fishing rod by an adhesive.

18. The swiveling tip for a fishing rod of claim 13, wherein the housing is attached to the fishing rod by a friction fit.

19. The swiveling tip for a fishing rod of claim 13, wherein the housing, the barrel, the axle and the roller are made of a material selected from the group comprising stainless steel, stamped steel, and plastic.

* * * * *